US008175415B2

(12) United States Patent
Mizutani

(10) Patent No.: US 8,175,415 B2
(45) Date of Patent: May 8, 2012

(54) IMAGE PROCESSING DEVICE AND COMPUTER-ACCESSIBLE RECORDING MEDIUM CONTAINING PROGRAM THEREFOR

(75) Inventor: Norio Mizutani, Mie (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 603 days.

(21) Appl. No.: 12/409,448

(22) Filed: Mar. 23, 2009

(65) Prior Publication Data

US 2009/0238491 A1 Sep. 24, 2009

(30) Foreign Application Priority Data

Mar. 24, 2008 (JP) ................................. 2008-076018
Feb. 20, 2009 (JP) ................................. 2009-037577

(51) Int. Cl.
*G06K 9/32* (2006.01)
*G06K 15/02* (2006.01)
(52) U.S. Cl. ........................................ 382/298; 358/1.2
(58) Field of Classification Search .................. 382/298, 382/305, 312; 358/1.2, 1.11, 528; 715/269, 715/273
See application file for complete search history.

(56) References Cited

U.S. PATENT DOCUMENTS

| 5,825,942 | A | 10/1998 | Miyaza |
| 5,896,470 | A | 4/1999 | Miyaza |
| 5,930,006 | A | 7/1999 | Yoshida et al. |
| 6,644,873 | B2 * | 11/2003 | Kurashina ........................ 400/61 |
| 6,646,759 | B1 * | 11/2003 | Koga ............................. 358/1.9 |
| 6,995,858 | B2 * | 2/2006 | Murakami et al. ........... 358/1.16 |
| 6,996,293 | B1 * | 2/2006 | Watanabe ....................... 382/284 |
| 7,797,631 | B2 * | 9/2010 | Yoshida ......................... 715/269 |
| 7,835,023 | B2 * | 11/2010 | Yamada ......................... 358/1.15 |
| 2006/0112333 | A1 * | 5/2006 | Iwanaga ......................... 715/531 |

FOREIGN PATENT DOCUMENTS

| JP | H11-242542 A | 9/1999 |
| JP | 2001-337994 A | 12/2001 |
| JP | 2005-020351 A | 1/2005 |
| JP | 2006-252443 A | 9/2006 |
| WO | 2005/032120 A1 | 4/2005 |

OTHER PUBLICATIONS

European Patent Office, European Search Report issued in counterpart Patent Application No. EP 09250778, mailed Jul. 7, 2009.
The State Intellectual Property Office of the People's Republic of China, Notification of the Second Office Action for Chinese Patent Application No. 200910130201.2 (counterpart to above-captioned patent application), issued Mar. 30, 2011.

* cited by examiner

*Primary Examiner* — Kanjibhai Patel
(74) *Attorney, Agent, or Firm* — Baker Botts L.L.P.

(57) ABSTRACT

An image processing device changes a size of original image represented by an original image data to create size-changed image data representing a size-changed image and outputs the size-changed image data to an output device. The image processing device has an image size determination unit determines a target image size based on a ratio of a predetermined standard character size to a character size regarding character data included in the original image data and based on an image size of the original image data. An image data creating unit changes the size of the original image to create the size-changed image data based on the determined target size. An output control unit controls an output of the created size-changed image data to the output device such that the size-changed image is shown within the image formation area in the output image.

16 Claims, 11 Drawing Sheets

| | THE NUMBER OF REDUCED IMAGES WITHIN ONE A4 SHEET | REDUCED IMAGE SIZE | NAME OF DOCUMENT |
|---|---|---|---|
| (1) | 1*2 | 120 × 160mm | A,B,G |
| (2) | 2*3 | 60 × 80mm | C,F |
| (3) | 3*4 | 40 × 50mm | H |
| (4) | 4*6 | 30 × 40mm | D,E |
| (5) | 5*8 | 20 × 30mm | I,J |

FIG. 9

IMAGE PROCESSING DEVICE AND COMPUTER-ACCESSIBLE RECORDING MEDIUM CONTAINING PROGRAM THEREFOR

CROSS-REFERENCE TO RELATED APPLICATION

This application claims priority under 35 U.S.C. §119 from Japanese Patent Applications No. 2008-076018 filed on Mar. 24, 2008 and No. 2009-037577 filed on Feb. 20, 2009. The entire subject matters of the applications are incorporated herein by reference.

BACKGROUND

1. Technical Field

The present invention relates to an image processing device for displaying an image on a display or printing an image on a printing sheet together with characters associated with the image. The present invention also relates to a computer-accessible recording medium containing a computer executable program for the image processing device.

2. Prior Art

Conventionally, there have been known image processing devices configured to receive image data containing image data and character data and display an image and characters represented by the received image data on a display device such as a CRT (Cathode Ray Tube) or an LCD (Liquid Crystal Display). When such an image is displayed on an image display area of the display device, depending on a size of the image display area, it may be impossible for a user to read the displayed characters since they are too small. For example, when a plurality of pieces of text data are displayed as thumbnail-size images, since each image is reduced at a relatively high reduction ratio, contents of each thumbnail-size image may become unreadable. Japanese Patent Provisional Publication No. 2001-337994 (hereinafter, referred to as '994 publication) discloses one solution to such a problem. According to '994 publication, additional information (which can be used for identifying individual thumbnail-size images: such as creation date, updated date, data name and the like) is overlaid on a predetermined area of the corresponding thumbnail-size images. Therefore, the user can recognize each of the thumbnail-size images easily, and identify the individual images easily based on such additional information.

SUMMARY OF THE INVENTION

The configuration disclosed in '994 publication is convenient if the user is familiar with the relationship between the additional information and the thumbnail-size images. However, when the thumbnail-size images created by another person and/or the additional information is inappropriate, the user may not identify the individual images. Similar problem may occur when an index printing (i.e., printing of a plurality of small-size images in m×n matrix on a printing sheet) is executed.

Such a problem also arises when the display area is smaller than the size of the image represented by the image data. That is, when the image having a relatively large size is reduced so that the entire image is displayed in a relatively small display area, the contents of the image may not be recognizable due to its high reduction ratio.

The above problem is conspicuous when the image contains characters, in particular, most of or all of the contents consist of characters.

In view of the above problem, aspects of the present invention provide improved information processing device and information processing method with which, when an image containing characters is outputted (e.g., printed/displayed) with its size reduced, the outputted (e.g., printed/displayed) characters have an appropriate size so that a user can recognize the same easily.

Throughout the specification, an expression such as "changing a size of image data" is intended to express that "processing image data in order to change a size of an image represented by the image data" for avoiding redundant expression.

According to aspects of the invention, there is provided an image processing device that changes a size of original image data representing an original image so as to create size-changed image data representing a size-changed image and outputs the size-changed image data to an output device in order to show an image within an image formation area in an output image. The image processing device is provided with an image size determination unit configured to determine a target image size of the size-changed image data that is to be created, based on a ratio of a predetermined standard character size to a character size regarding character data included in the original image data and based on an image size of the original image data, an image data creating unit configured to change the size of the original image data so as to create the size-changed image data, based on the determined target size, and an output control unit configured to control an output of the created size-changed image data to the output device such that the size-changed image is shown within the image formation area in the output image.

According to other aspects of the invention, there is provided a computer-accessible recording medium containing a computer program including instructions which causes the computer to execute an image processing operation that changes a size of original image data representing an original image so as to create size-changed image data representing a size-changed image and outputs the size-changed image data to an output device in order to show an image within an image formation area in an output image, the instructions causes the computer to determine a target image size of the size-changed image data that is to be created, based on a ratio of a predetermined standard character size to a character size regarding character data included in the original image data and based on an image size of the original image data, to change the size of the original image data so as to create the size-changed image data, based on the determined target size, and to control an output of the created size-changed image data to the output device such that the size-changed image is shown within the image formation area in the output image.

According to the above configurations, the size-changed image data can be created to represent an image having an appropriate size taking the predetermined standard character size and the character size of the original image data.

BRIEF DESCRIPTION OF THE ACCOMPANYING DRAWINGS

FIG. 1 is a block diagram showing a hardware configuration of a printer according to embodiments of the present invention.

FIG. 2 schematically shows a display unit of the printer according to the embodiments of the invention, an entire page of a document being displayed on a display screen.

FIG. 3 schematically shows the display unit in which the document is displayed with the optimum character size.

Figure 8:
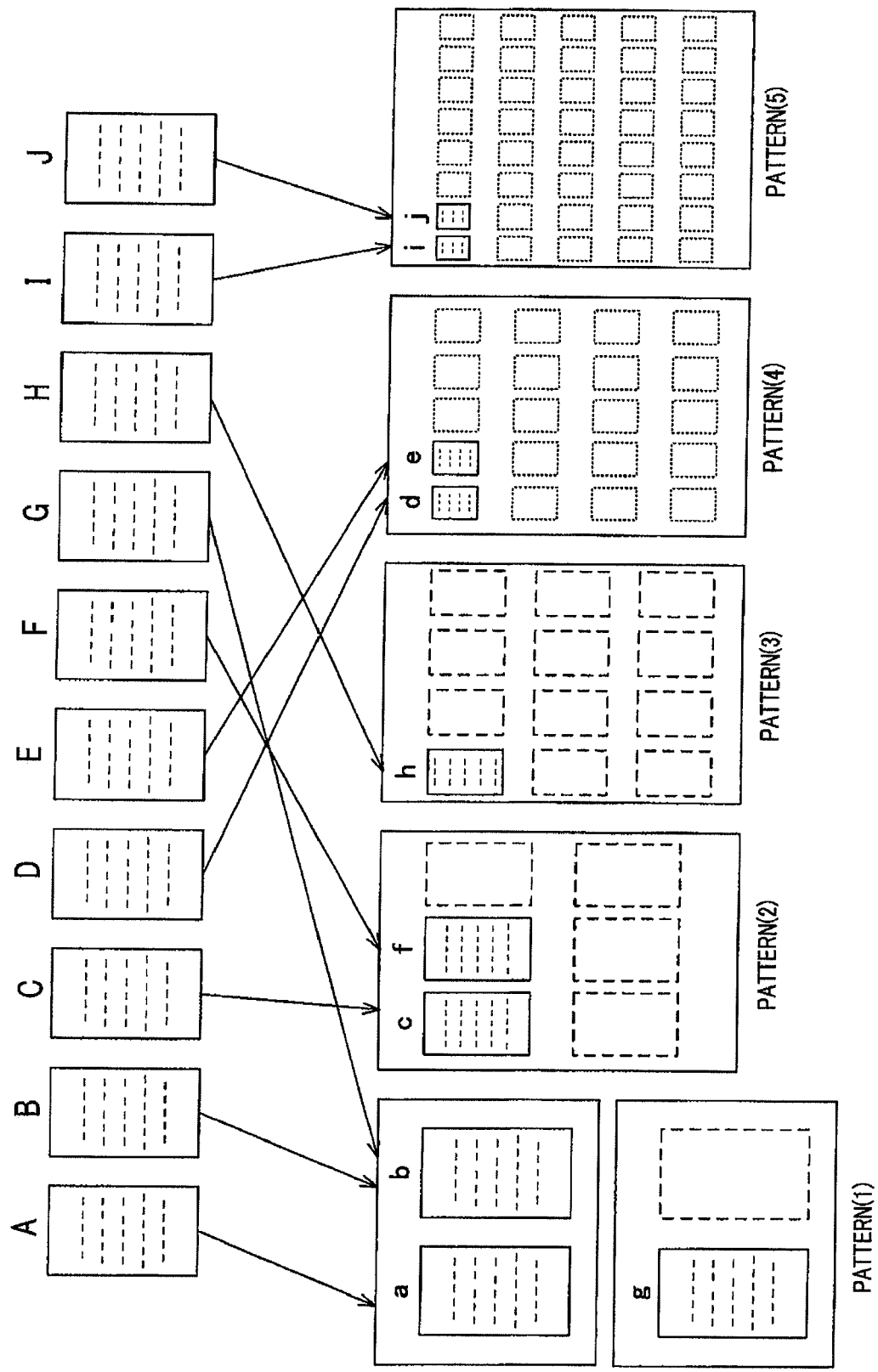

FIG. 8 schematically illustrates classification and display of index images according to a second embodiment of the invention.

FIG. 9 shows a classification management table according to the second embodiment.

Figure 10:
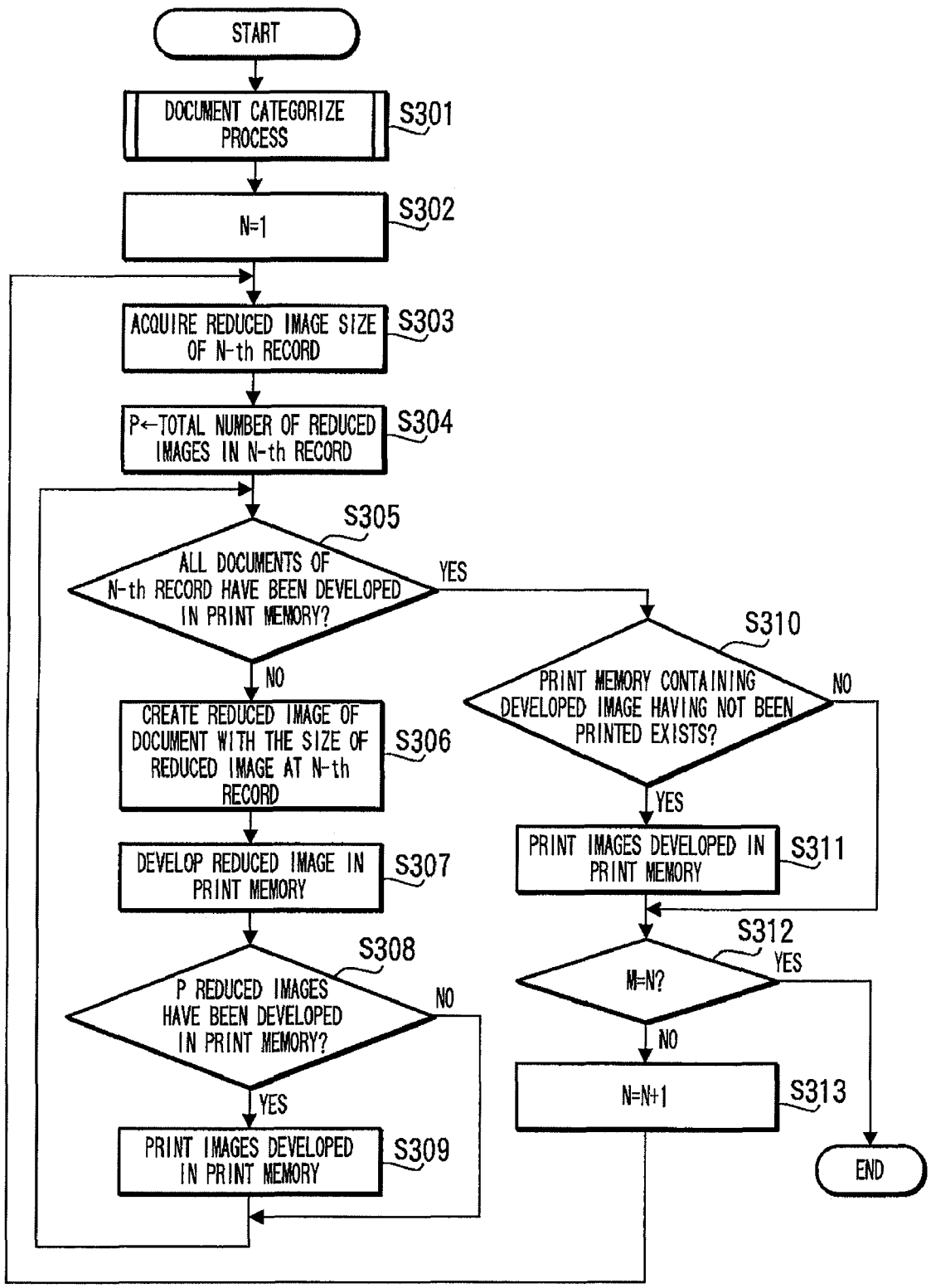

FIG. 10 shows a flowchart illustrating an index image creating process according to the second embodiment of the invention.

Figure 11:
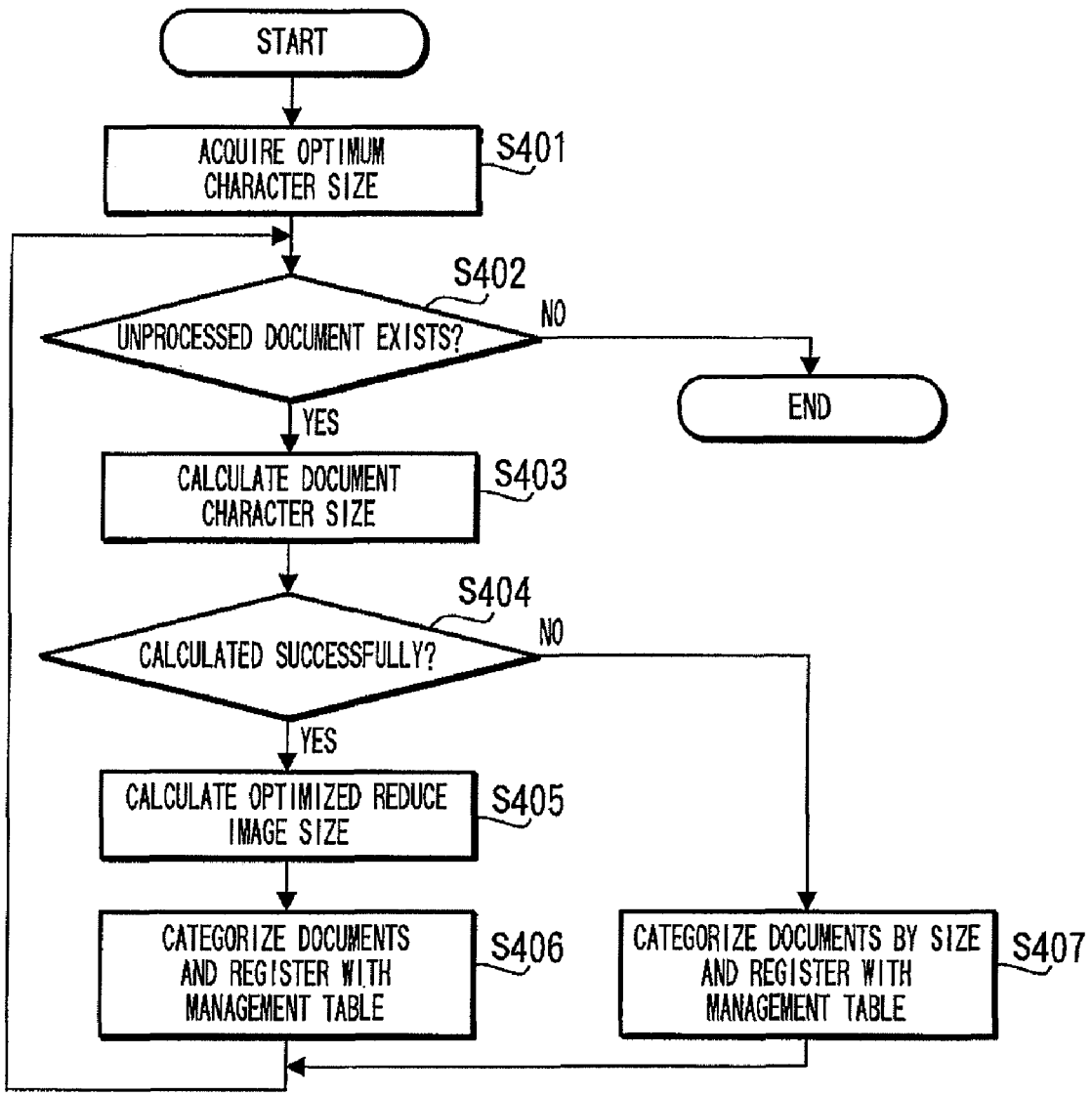

FIG. 11 is a flowchart illustrating a sub-process called in the index image creating process shown in FIG. 10.

Figure 12:
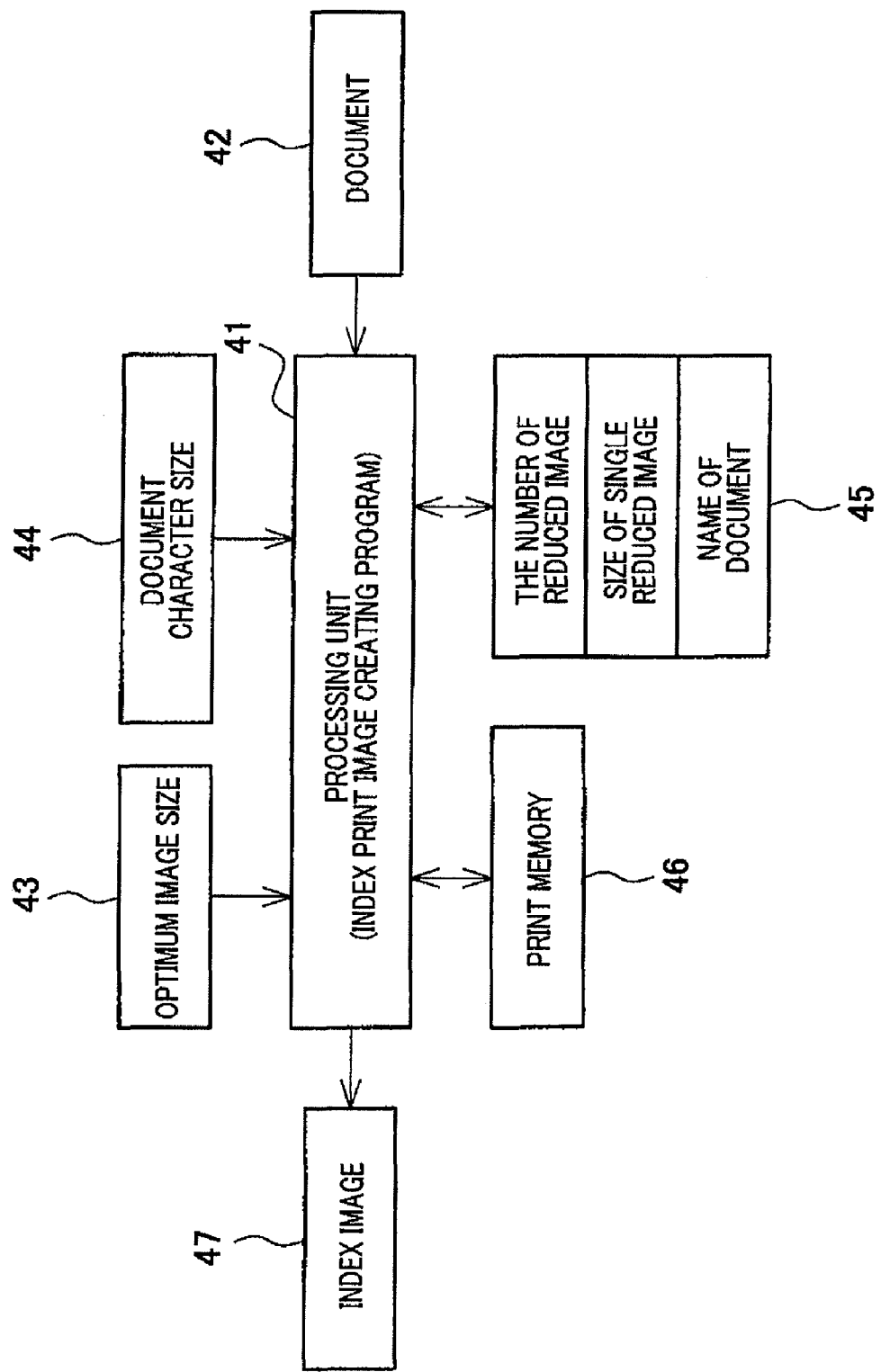

FIG. 12 is a chart illustrating a functional configuration of the index image creating process according to the second embodiment.

DETAILED DESCRIPTION OF THE EMBODIMENTS

Hereinafter, referring to the accompanying drawings, an information processing device according to the embodiments of the invention will be described.

Figure 1:
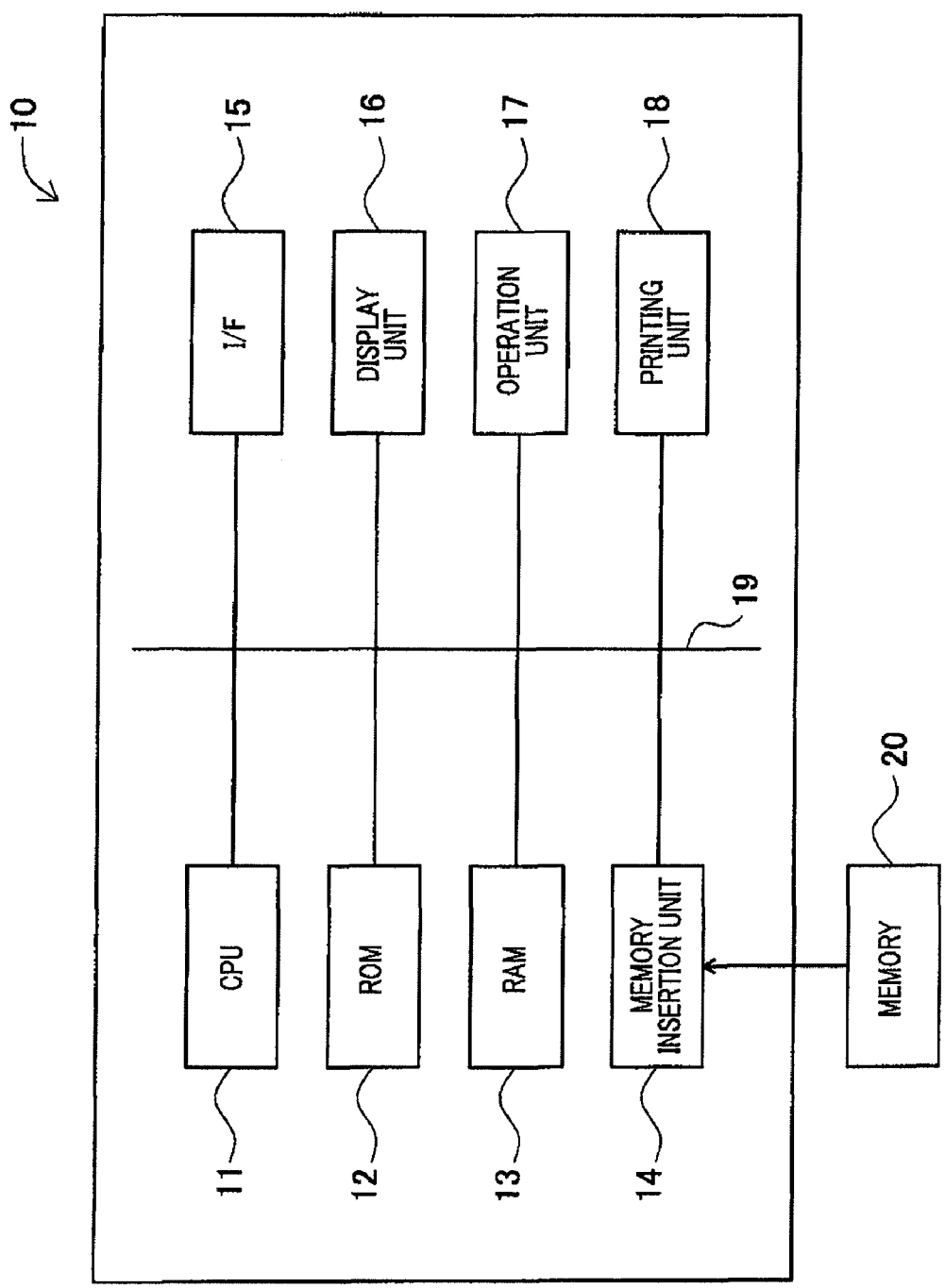

FIG. 1 is a block diagram showing a hardware configuration of a printer 10 which is an embodiment of the information processing device according to aspects of the invention. In the printer 10, an image processing program which causes the printer to perform an image processing process is installed.

The printer 10 is provided with a CPU (Central Processing Unit) 11 which executes various programs installed in the printer 10 and controls an entire operation of the printer 10. The printer 10 is further provided with a ROM (Read Only Memory) 12 for storing the programs, and a RAM (Random Access Memory) 13 for temporarily storing data which is necessary when the CPU 11 executes the various programs. The CPU 11, the ROM 12 and the RAM 13 are interconnected through a bus line 19.

The printer 10 is further provided with a memory insertion unit 14 in which an external memory such as a USB (Universal Serial Bus) memory and the like can be inserted, an interface (I/F) 15 which interfaces connection and communication between the printer 10 and an external device such as a PC (Personal Computer) so that the printer 10 can receive data (e.g., print data) from the external device. The printer 10 is further provided with a display unit 16 for displaying an image which is subject to printing and an operation unit 17 through which a user can input various operation commands and/or data.

The above-described components including the CPU 11, ROM 12 and RAM 13 are also interconnected through the bus line 19. The display unit 16 is provided with displaying elements such as an LCD (Liquid Crystal Display) and an LED (Light Emitting Diode). The operation unit 17 has a plurality of groups of switches.

The printer 10 further includes a printing unit 18 provided with a print head. The printer 10 prints an image on a printing sheet which is fed in a predetermined direction by moving the print head in a direction perpendicular to the feeding direction of the printing sheet. The printing unit 18 is also connected to the CPU 11 through the bus line 19.

<First Embodiment>

In the printer 10, a display image creation program is installed. When the printer 10 (i.e., the CPU 11) executes the display image creation program, a display image creation process is executed. In the display image creation process, an image to be displayed on the display unit 16 is created based on image data (i.e., document data created by word processing software or the like, including layout information and/or attribution information or JPEG data and the like). In the following description, the original image based on which the image to be displayed and/or printed is created will be referred to as a document. That is, in the display image creation process, an image to be displayed on the display unit 16 is created based on the document. According to a first embodiment, when an image to be displayed on the display unit 16 is created based on the document, a size of the image is adjusted so that characters included in the document can be recognized by the user.

Figure 2:
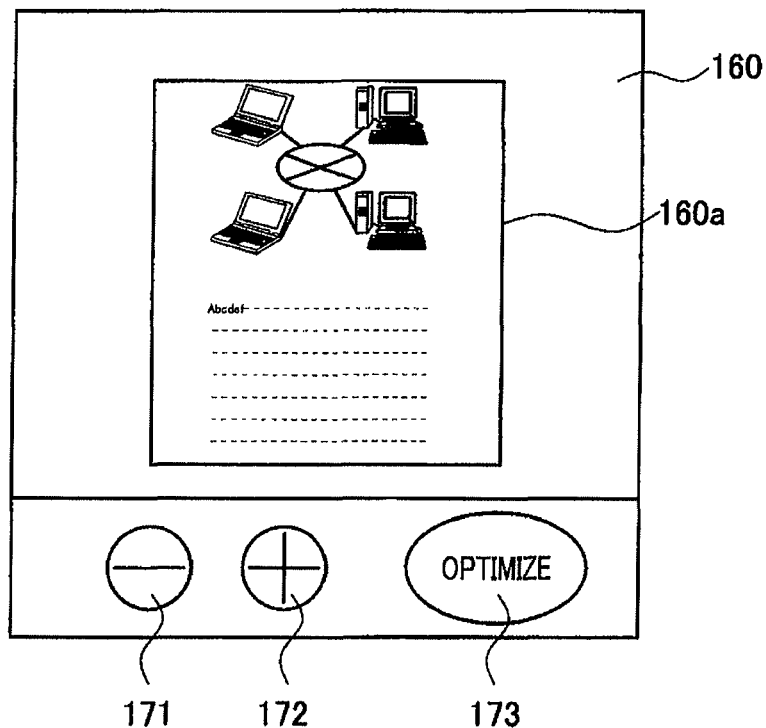
Figure 3:
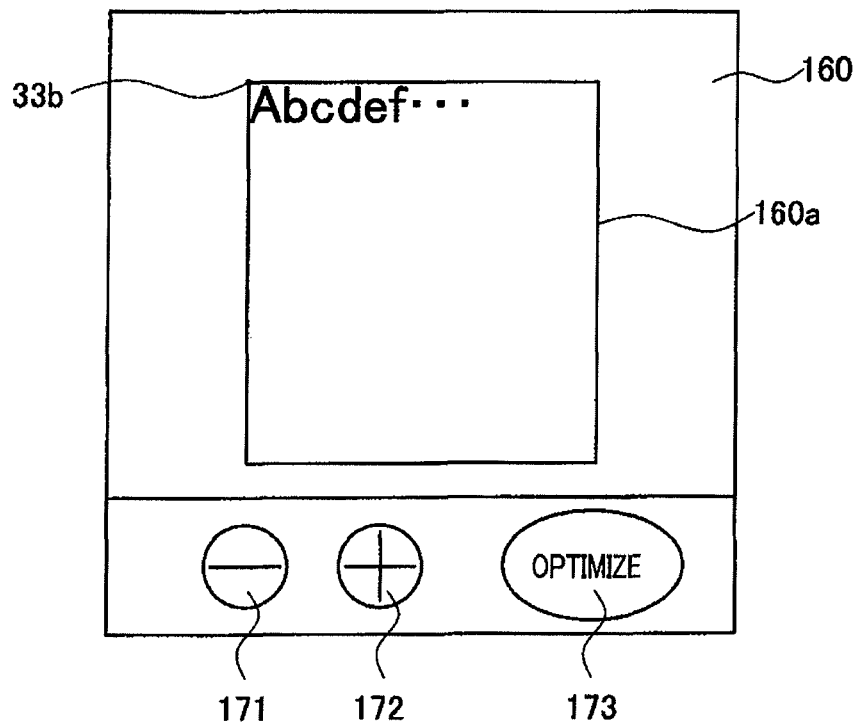

FIGS. 2 and 3 schematically show the display unit 16 and the operation unit 17 of the printer 10. On a front surface of a body (not shown) of the printer 10, a display screen 160 of the display unit 16 is provided. According to the first embodiment, an image can be displayed in the entire area of the display screen 160. Below the display screen 160, as shown in FIGS. 2 and 3, image size changing buttons, which are part of the operation unit 17, are provided. Specifically, the image size changing buttons include, according to the first embodiment, a plus button 171 for enlarging an image displayed on the display screen 160 stepwise, by 5%, and a minus button 172 for reducing the image displayed on the display unit 16 stepwise, by 5%. The operation unit further includes, below the display screen 160, an optimize button 173 for displaying characters of a predetermined size.

When a document, which is stored in an external memory 20, is printed, firstly the external memory 20 is inserted in the memory insertion unit 14. Then, a document stored in the external memory 20 is retrieved and an image, which is created based on the retrieved document, is displayed on the display screen 160 so that the user can recognize the contents of the document. The user look at the displayed image of the document to check whether the document is an intended one (i.e., whether the displayed document is a document the user intends to print out or the like).

In the display image creation process according to the first embodiment, the size of the characters included in such a document is treated so that they can be displayed to have a sufficient size for recognition by the user, on the display screen 160.

In the ROM 12, screen size data (height and width) of the display screen 160 is stored as fixed values.

Incidentally, the printer 10 is configured such that, when the display image creation process is executed, the size of the characters included in the image to be displayed on the display screen 16 can be changed.

When the optimize button 173 is depressed, the user is allowed to change the size of the characters included in the image displayed on the display screen 16. That is, the user can set the size of the displayed characters at a desired size at which the characters can be recognized easily. The thus set size (i.e., the user's intended size) is stored in the printer 10 as a set value. In the following description, the set value which is determined by the user will be referred to as an "optimum character size."

For example, when the image of the document is displayed on the display screen 160, a reduced image, which represents an entire page displayable within a display area 160*a* of the display screen 160, is initially displayed as shown in FIG. 2. That is, one of the height and width of the image is equal to or substantially equal to the corresponding one of the height and width of the display area 160*a* and the other of the image is equal to or less than the corresponding one of the height or width of the display area 160*a* so that the entire page is displayed within the display area 160*a*. In the following description, the above state where an initial image (i.e., an image representing an entire page) is displayed on the display screen will be referred to an "initial screen."

Generally, however, in the initial screen, the characters included in the displayed image might be too small and the user may not recognize the contents based on what is meant by the characters (i.e., the contents of the document may not be recognized by the user). In the following description, it is assumed that the document size is larger than the display area 160*a*. Therefore, when the entire page is displayed within the display area 160*a*, the displayed image is a "reduced" image of the document.

In the above situation (i.e., when the characters in the displayed image are too small to recognize), the user has two choices. One is to enlarge the entire image of the initial screen using the plus button 171 (and the minus button 172 for reduction if the image is enlarged excessively). The other is to operate the optimize button 173.

When the optimize button 173 is depressed, the image of the initial screen as shown in FIG. 2 is switched to an optimized reduced image, an example of which is shown in FIG. 3.

The concept of the optimization in this embodiment will be described in detail. If the character size in the document is 12 point and the optimum character size is 6 point, when the user depresses the optimize button 173, an optimized reduced image, which has an optimized reduced size so that the character size of the reduced image is 6 point, is created and displayed on the display screen 160. The optimized reduced size is calculated such that, the character size of the document which is subjected to processing is detected, and the reduction ratio is determined based on the detected character size (i.e., the character size in the document) and the optimum character size. Then, the optimized reduced image is created based on the thus calculated reduction ratio, The character size of the document is determined as follows.

For example, a size of a first character in the document is detected, or sizes of a predetermined number of characters (e.g., first and subsequent characters) of the document are detected as target characters and then the character size of the document is determined based on the thus detected sizes. Specifically, when the document is of a horizontal writing, the first character or the plurality of characters are identified with respect to the upper left character on a page. The characters located at such positions may be a title or beginning characters of the document, and such characters are used for determining the character size of the document.

For another example, all the characters on a first page of the document may be checked to determine a character having a maximum occurrence within the first page, and the character size of the document may be represented by the size of the most frequently used character. Alternatively, all the characters of the first page of the document may be checked and the size of the smallest character or the largest character may be referred to as the target characters which represent the character size of the document.

Further alternatively, the sizes of all the characters within the first page of the document may be averaged and used as the character size of the document. When the document include a plurality of pages, the character size may be determined by checking the characters within the first page. Alternatively, the character size may be determined by checking all the characters within the document, and then the character size may be determined in a similar manner to a case where the character size is determined by checking the characters only in the first page as described above.

It should be noted that, in the concrete example described later, the first six characters are referred to as the target characters, that is, the sizes of the first six characters of the document are averaged and used to represent the character size of the document.

In the display image creation process, documents including character data are subjected to processing as described above. It should be noted that, among the documents stored in the external memory 20, ones which do not include character data (e.g., JPEG data) may be included. For such documents, since no character data is included, the reduction ratio cannot be calculated, and thus, the optimized reduced image size cannot be calculated. Therefore, documents which do not include the characters may be displayed as in a state shown in FIG. 2, or at a predetermined image size which may also be set by the user.

When the image displayed on the display screen 16 is created in response to operation of the optimize button 173, the optimized reduced image may be larger than the display area 160*a*. In such a case, only a part of the image is displayed on the display screen 160. It is preferable that, even in such a case, the user can recognize the contents of the document correctly from the displayed image. In this regard, according to the first embodiment, display of the image is controlled such that, when the optimized reduced image is displayed on the display screen 160, at least one character included in the optimized reduced image is displayed within the display area 160*a*.

Figure 4:
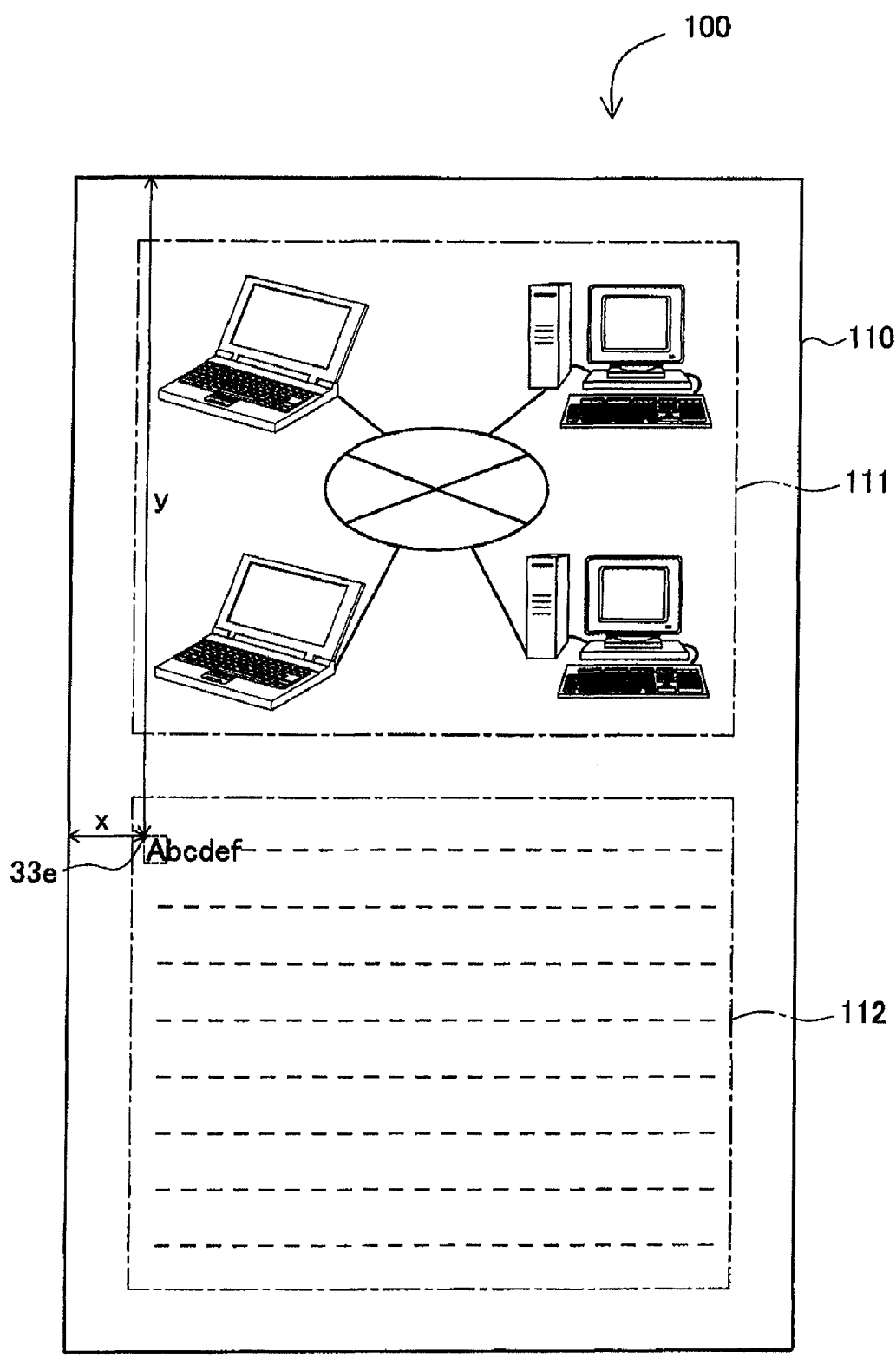
FIG. 4 shows an example of a page of a document which contains an illustration and characters.

For example, FIG. 4 shows one page of image based on the document (when the document consists of multiple pages, a predetermined one page such as the first page of the document). This document (page) 100 has a drawing area 111 (upper side) and a text area 112 (lower side) within a document size frame 110. In the drawing area 111, drawings are arranged, while text (characters) is arranged in the text area 112.

If display of the optimized reduced image is executed such that the upper left of the optimized reduced image and the upper left of the display area 160*a* are aligned, no image may be displayed on the display area 160*a* (i.e., a blank portion may be displayed in the display area 160*a*) or only a portion of the reduced image may be displayed in the display area 160*a*. If the image is displayed in such a state, the advantage cannot be provided to the user who intends to grasp the contents of the document based on the characters displayed on the display screen 160 (it becomes necessary for the user to scroll the displayed image). Therefore, when the optimized reduced image is displayed in the display area 160*a* with the optimum character size, it is preferable that a portion which is effective to the user is displayed on the display screen 160. According to the first embodiment, at least six letters from the beginning of the document are displayed on the display screen 160 (see FIG. 3).

Even if such a text area 112 is not provided at the beginning of the document 100, the characters in the optimized reduced image are displayed in the display area 160*a* such that the characters can be recognized by the user (see FIG. 3). Incidentally, according to the first embodiment, the optimized image size is calculated based on the six characters on the first line, the six letters "Abcdef" on the first line of the text area 112 such that the top letter (character) "A" is located at the upper left corner of the display area 160*a* (hereinafter, the upper left corner of the display area 10*a* will be referred to a reference position).

In the reduced image creation process, an optimized reduced image management table for managing the optimized reduced image and a reduced image management table for managing the reduced image for display are created.

The optimized reduced image management table stores the followings:
(1) a character size of the characters, which are subject to determination of the character size representing the character size of the document (hereinafter, referred to as a document character size);
(2) an "optimized reduced image display position" representing positional information for arranging the characters referred to for determining the document character size at the predetermined position in the display area 1 60*a* when the optimized image is displayed;
(3) an "optimum reduced image size" representing the size of the optimized reduced image; and
(4) "optimized reduced image data" which is created to display the image at the optimized reduced image size.

The reduced image management table stores:
(1) a "reduced image display position" representing positional information of the reduced image arranged at the reference position of the display area 160*a*;
(2) a "reduced image size" representing the size of the reduced image for display; and
(3) "reduced image data" representing an image to be displayed at the initial display.

It should be noted that the size of the reduced image displayed at the initial display (hereinafter, referred to also as an initial image) is equal to or substantially equal to the display area 160*a* (see FIG. 2). That is, in FIG. 2 a rectangular portion indicated in the display screen 160 represents an outline of the document, which coincides with the display area 160*a*. Accordingly, in the initial display, the reduced image display position is the upper left corner of the display area 160*a*.

It should be noted that, by creating the optimized reduced image data when the CPU 11 is not busy and registering the same with the optimized image management table in advance, it becomes possible to display the optimized reduced image on the display screen 160 quickly in response to operation of the optimize button 173. That is, if the optimized reduced image is created when the CPU 11 is not busy (e.g., the CPU 11 is in an idling state), if the optimize button 173 is depressed, the registered optimized reduced image is copied to the reduced image management table as it is and displayed on the display screen 160.

Incidentally, an initial value of the optimum character size has been set. Therefore, if the user wishes to set the optimum character size different from the initial value thereof, a value changing operation should be executed. For this purpose, an optimum character size setting program for executing an optimum character size setting process is stored in the ROM 12.

For example, an optimum character size setting button (not shown) may be provided to the operation unit 17, and the optimum character size setting program may be executed in response to depression of the optimum character size setting button. Then, a size setting menu may be displayed on the display screen 160 for allowing the user to set the optimum character size. The user then inputs a desired size (e.g., a point number) with a ten key to input the desired value. Such a configuration for setting the font size is well known and detailed description will not be provided for brevity.

Alternatively, test characters may be displayed at the initial character size and user may be allowed to change the size of the displayed characters by operating the buttons 171 and 172. When the displayed test characters are displayed in a desired character size, the user may depress the optimize button 173 for a certain period of time to input the current character size. It should be noted that the above methods for entering the user setting of the initial character size are only exemplary methods, and various modifications may be employed.

Next, display of the reduced image (including display of the optimized reduced image) based on the document will be described.

Figure 5:
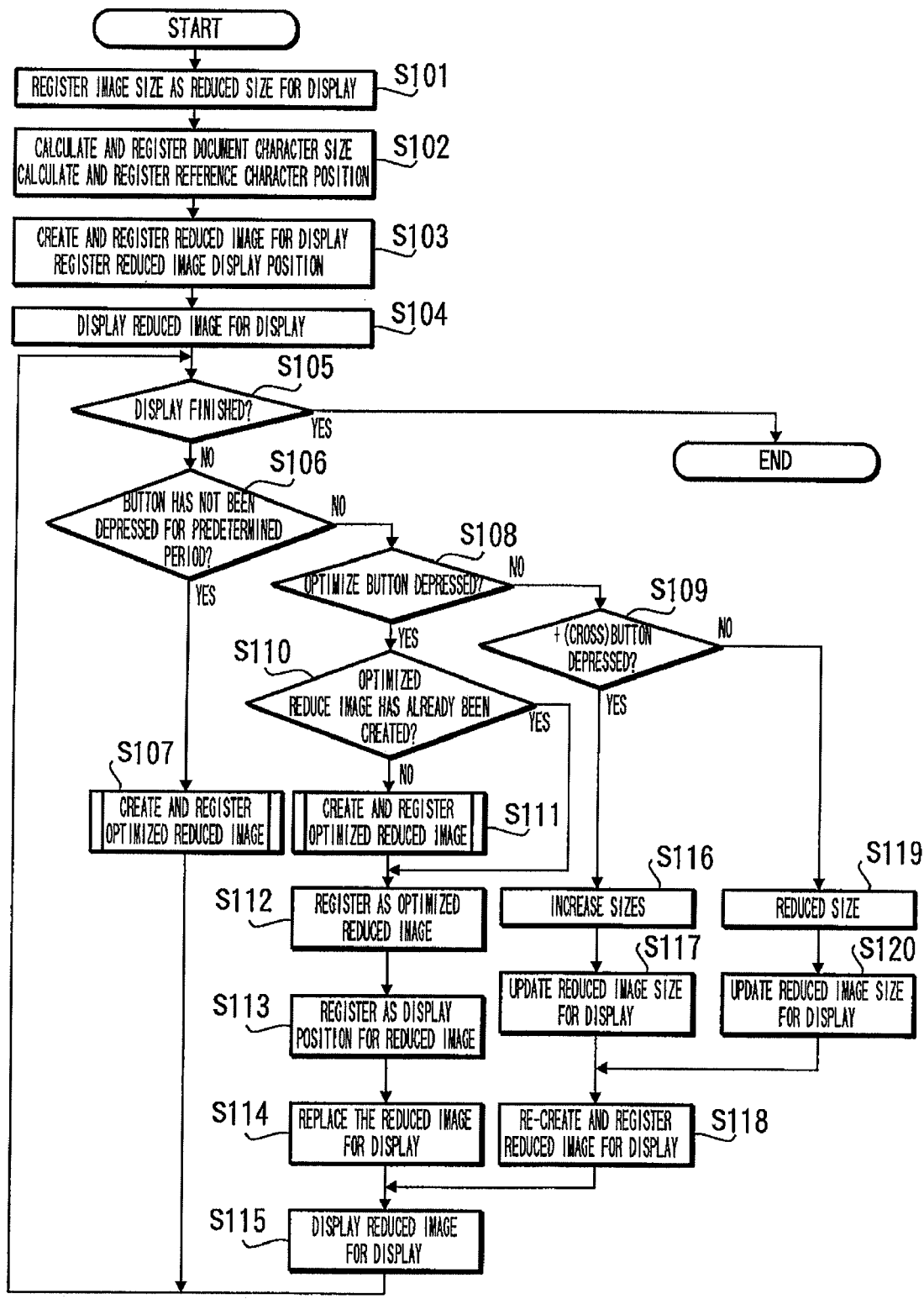
FIG. 5 shows a flowchart illustrating a display image creating process for creating a reduced image of a document to be displayed on the display unit of the printer according to a first embodiment of the invention.
Figure 7:
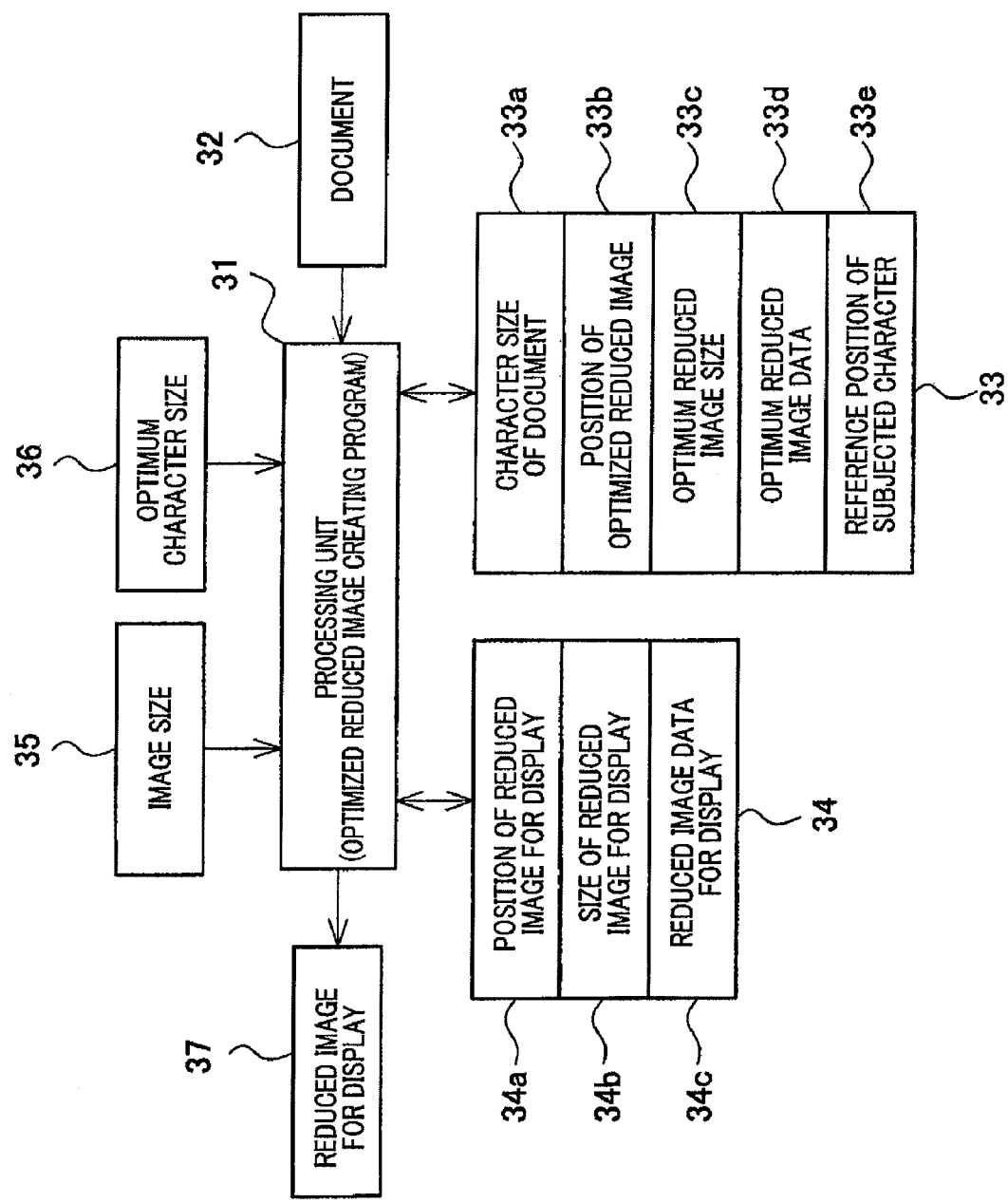
FIG. 7 is a chart illustrating a functional configuration of the display image creating process according to the first embodiment.

FIG. 5 shows a flowchart illustrating a display image creating process and FIG. 7 is a chart illustrating a functional configuration of the display image creating process.

When the external memory 20 is inserted in the memory insertion unit 14, document information is retrieved from the external memory 20 and displayed on the display screen 160. When the user selects one document 32 of the displayed documents (e.g., by its file name), a processing block 31 retrieves the selected document 32 from the external memory 20. Then, the processing block 31 starts the display image creating process shown in FIG. 5.

When the display image creating process is started, the processing block 31 registers the size of the initial image with the reduced image management table 34 as a reduced image size 34*b* (S101). Then, the processing block 31 calculates the document character size 33*a* representing the size of the characters included in the document 32, and the character reference position 33*e* for determining the optimized reduced image position 33*b*, and registers the same with the optimized reduced image management table 33 (S102). According to the embodiment, the document character size is determined by averaging the sizes of first six characters of the document 32. The character reference position 33*e* is a position of the upper left corner of a rectangle enclosing a first character "A" of the six characters from which the document character size is obtained. For example, the character size of each of the characters "Abcdef" is 12 points, the rectangle is a square of which a length of each side is 12 points (see FIG. 4). If the selected document is a document which does not include characters (e.g., JPEG data file), the processing block 31 skips S102.

Next, the processing block 31 creates reduced image data 34*c* based on the reduced image size 34*b* which has been stored in advance. Then, the thus created reduced image data 34*c* is registered with the reduced image management table 34 and the upper left corner of the display area 160*a* is registered as the reduced image display position (S103). Since the size of the initial image is equal to or substantially equal to the display area 160*a*, there is no information regarding the display position for the initial image. It should be noted that, for the initial image, the display position is the upper left corner regardless of the document.

Next, the processing block 31 displays the reduced image (initial image) 37 on the display screen 160 based on the reduced image data 34*c* (S104). Concretely, the reduced image 37 is displayed as the initial image as shown in FIG. 2.

Next, the processing block 31 judges whether a command for terminating the display of the document 32, which is displayed on the display unit 160, is input (S105). For example, the processing block 31 judges that the termination command has been input when a cancel button (which may be provided to the operation unit 17) is depressed and printing of the document 32 will not be performed, or there occurs a request for an interruption of the process. Thus, if the termination command is input (S105: YES), the displayed document 32 is extinguished from the display screen 16, the reduced image creation process is terminated, and the initial menu is displayed on the display screen 160.

If the termination command is not input (S105: NO), the processing block 31 judges whether a predetermined period has passed without any input since a previous input through the operation unit 17 (e.g., by operating one of the buttons 171-173) (S106). If the printer 10 has been an idle state for the predetermined period (S106: YES), the processing block 31 starts creating the optimized reduced image data 33d for displaying the optimized reduced image of the document and registers the optimized reduced image data 33d with the optimized reduced image management table 33 (S107). Step S107 is executed so that the optimized reduced image can be displayed on the display screen 106 quickly when the optimize button 173 is depressed. Incidentally, during the idle state of the printer 10, the initial image or the like is kept displayed on the display screen 160.

If one of the buttons 171-173 was depressed (S106: NO), the processing block 31 judges which button was depressed (S108-S109). If the optimize button 173 was depressed (S108: YES), the process proceeds to S110. If the plus button 172 was depressed (S109: YES), the process proceeds to S116. If the minus button 171 was depressed (S109: NO), the process proceeds to S119.

In S110, the processing block 31 judges whether the optimized reduced image has already been created based on whether the optimized reduced image data 33d is registered with the optimized reduced image management table 33. If the optimized reduced image data 33d has been registered (S110: YES), the processing block 31 executes S112. If the optimized reduced image data 33d has not been registered with the optimized reduced image data management table 33 (S110: NO), the processing block 31 proceeds to S112.

Thus, if none of the buttons (e.g., the plus button 172) was depressed for a predetermined period and the printer 10 has been in the idle state (S106: YES), the optimized reduced image data 33d has been created in S107. Therefore, in such a case, the processing block 31 proceeds to S112. If the optimize button 173 has been depressed before the predetermined period has elapsed (S106: NO), the optimized reduced image data 33d has not been created (S110: NO), and the processing block 31 creates the optimized reduced image data 33d (S111).

Figure 6:
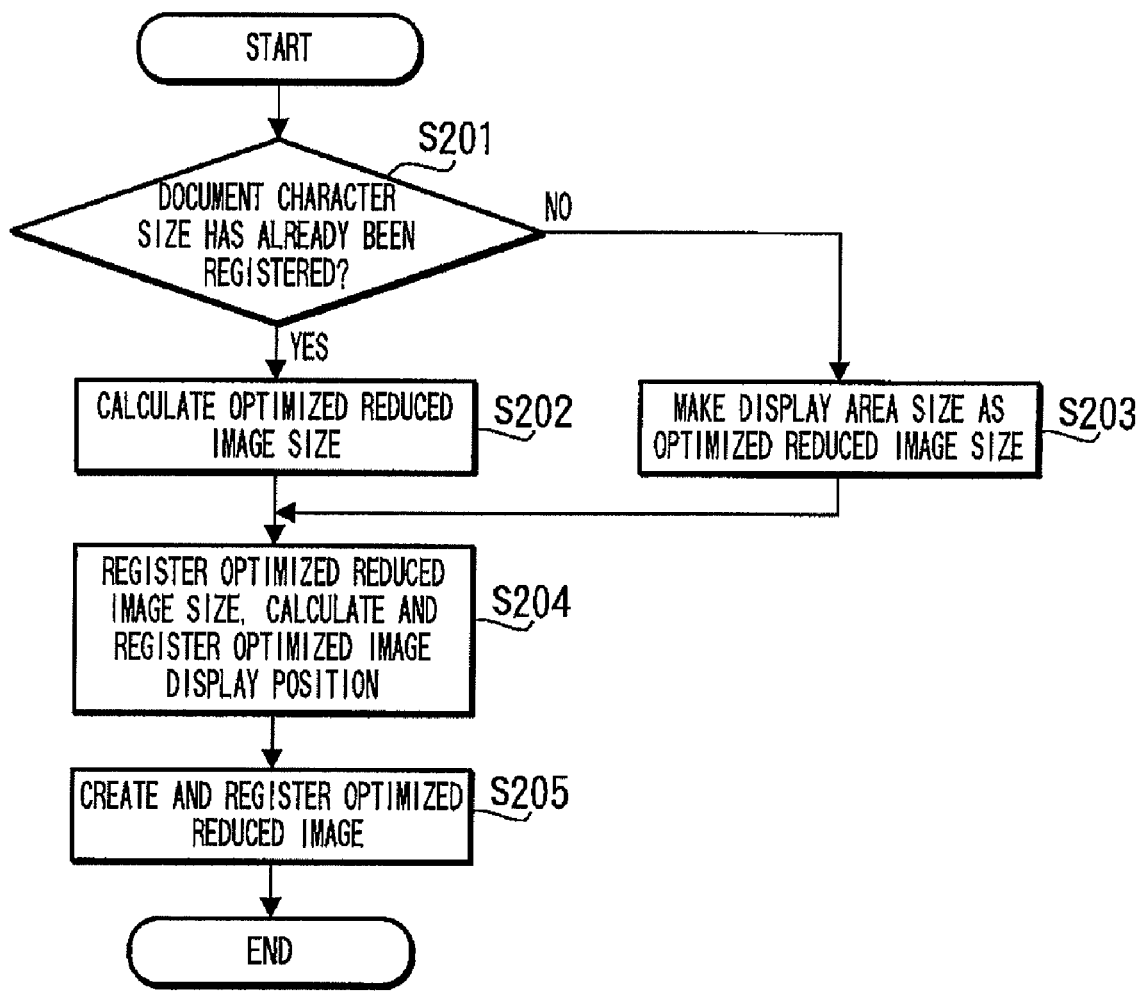
FIG. 6 shows a flowchart illustrating a sub-process called in the display image creating process shown in FIG. 5.

FIG. 6 is a flowchart illustrating an optimized reduced image creation process which is called in S107 or S117 of FIG. 5. In S201, the processing block 31 judges whether the document character size has been registered (in S102) with the optimized reduced image management table 33. If the processing block 31 judges that the document character size has been registered with the reduced image management table 34 (S201: YES), the size of the optimized reduced image is calculated, in S202, by an equation:

> the optimized reduced image size=(the optimum character size 36)/(document character size 33a)× document size If the document size is A4 (width: 210 mm×height: 297 mm), the character size 36 is 12 points and the optimum character size 36 is 6 points, a ratio of the optimum character size to the character size of the subject characters is 0.5 (i.e., a half). Therefore, the processing unit calculates that the optimized reduced image size is a size of which width is 105 mm and height is 148 mm (S202). This size is A6 (width: 105 mm×height: 146 mm) or substantially equal to this size.

Then, the processing block 31 registers the thus calculated optimized reduced image size 33c and the optimized reduced image display position 33b (which is also calculated by the processing block 31) with the optimized reduced image management table 33 (S204). Then, referring to the document 32, the processing block 31 creates the optimized reduced image data 33d having the optimum reduced image size 33c (S205). It should be noted that the processing block 31 calculates the optimized reduced image position 33b based on the reference position 33e registered with the optimized reduced image management table 33 in S102 and a ratio of the character size of the subjected character(s) to the optimum character size. For example, if the coordinates of reference position 33e are X (in the width direction) and Y (in the vertical direction) (see FIG. 4), the optimum reduced image position 33b are 0.5 X (in the width direction) and 0.5 Y (in the vertical direction).

If the optimize button 173 has been depressed for the document 32 that does not include characters, S102 is not executed and thus determination in S201 is negative (S201: NO). Then, the processing block 31 determines the size of the display area 160a is the optimum reduced image size 33c (S203) and registers the this size with the optimized reduced image management table 33, and also registers the upper left corner of the initial image (i.e., an origin O in FIG. 4) with the optimized reduced image management table 33 as the optimized reduced image display position 33b (S204). Further, the processing block 31 registers the initial image with the optimized reduced image management table 33 as it is (S205) and terminates the process.

In FIG. 5, the processing block 31 registers the optimum reduced image size 33c, which is registered with the optimized reduced image management table 33, with the display image management table 34 as the display image size 34b (S112). In S113, the processing block 31 registers the optimized reduced image display position 33b with the display image management table 34 as the reduced image display position 34a. Incidentally, the optimized reduced image display position 34b registered in S112 is referred to when S116 and S119 are executed.

In S114, the processing block 31 replaces the optimized reduced image data 33b of the optimized reduced image table 33 with the display image data 34c of the display image management table 34. Then, the processing block 31 displays the reduced image 37 on the display unit 160 based on the newly registered/stored display image position 34a, the reduced image display size 34b and the display image data 34c (S115). Specifically, the display image 37 represented by the display image data 34c is displayed in the display area 160a such that the reduced image display position 34a is located on the reference position within the display area 160a.

FIGS. 2 and 3 show an example of the display before and after the optimize button 173 is depressed. FIG. 2 shows a situation where an entire page of a document is displayed within the display area 160a as the initial image. When the optimize button 173 is depressed, the display image 37 having the optimum character size, which has been set by the user, is displayed within the display area 160a as shown in FIG. 3. The displayed image 37 in the display area 106a is enlarged in comparison with the initial image shown in FIG. 2.

In FIG. 2, when the initial image is displayed, it is difficult for the user to recognize the characters displayed in the display area 160a. By simply depressing the optimize button 173, the reduced image 37 having the optimum character size is displayed, which can be recognized by the user.

In addition to the above, according to the embodiment, when the user operates the plus button 172 and minus button 171, the image displayed within the display area 160a can be enlarged and reduced, respectively.

After the reduced image 37 is displayed as S104 or S115 is executed, if the processing block 31 detects operation of the plus button 172 (S106:NO; S108: NO; S109: YES), the processing block 31 enlarges the display size 34b registered in the display image management table 34 by a predetermined amount (S116). For example, upon each operation of the plus button 172, the processing block 31 may enlarge the registered display image size 34b by five percents, and updates the display image management table 34 by registering the enlarged size as a newly defined display size 34b (S117). Then, the processing block 31 re-creates the reduced image data 34c representing an image of which size is equal to the display image size 34b updated in S117, and stores the thus created display image data 34c with the display image management table 34 (S118). Then, the processing block 31 displays the reduced image thus created and registered in S118 in the display area 160a (S115).

If the processing block 31 detects operation of the minus button 171 (S106:NO; S108: NO; S109: NO), the processing block 31 reduces the display size 34b registered in the display image management table 34 by a predetermined amount (S119). For example, upon each operation of the minus button 171, the processing block 31 may reduce the registered display image size 34b by five percents, and updates the display image management table 34 by registering the reduced size as a newly defined display size 34b (S120). Then, similar to the case where the plus button 172 is depressed, the processing block 31 re-creates the reduced image data 34c and displays the reduced image thus created and registered in S118 in the display area 160a (S115).

According to the above-described first embodiment, the display image creation program is stored in the printer 10. When the display image creation program is executed, the display image creation process is executed and a reduced image 37 to be displayed in the display area 160a of the display unit 160 is created based on the document 32. This technique can be applied not only to printers but also other devices such as multi-function devices, personal computers and the like which have a function of displaying an image of a document. For example, the display image creation program may be installed in a personal computer, and used for displaying not only documents stored in an external memory but also documents which may be retrieved through the Internet.

<Modification of First Embodiment>

In the above-described first embodiment, the document character size is determined with reference to the character size of the target characters. Specifically, an average of the subsequent six characters including the first character in the document is employed as the document character size. Alternatively, the document character size may be determined using other characters. For example, a keyword consisting of a plurality of characters may be determined in advance, and if a character string which is identical to the keyword is included in the document, the character string (which is identical to the keyword) is used as the target characters and the document character size may be determined.

Specifically, in the memory (e.g., the RAM 13) of the printer 10, one of more keywords determined by the user are stored. The display image creating program judges, in S102, whether a character string which is identical to the keyword is included in the document. Then, if the character string identical to the keyword is included in the document (S102: YES), the display image creation program uses the character string as the target characters and determines the document character size. By employing the above configuration, when the optimize button 173 is depressed, in the display area 160a of the display 160, a portion that includes the character string identical to the keyword is displayed. As a result, the user can recognize the contents of the document relatively easily based on the character string (i.e., the keyword). It should be noted that if a plurality of character strings each of which is identical to the keyword are included in one document, the first occurrence of such a character string may be referred to as the target characters.

In the memory of the printer 10, a plurality of keywords may be stored. In such a case, the display image creation program judges whether character strings identical to each of the plurality of keywords are included in the document. If the document includes character strings identical to one or some of the keywords, the display image creation program may determine the document character size using the thus found character strings as the target characters. For example, if the document includes a first character string identical to a first keyword and a second character string identical to a second keyword, earlier occurrence of the first character string or the second character string (e.g., the first character string) may be selected as the target characters.

Optionally, when a plurality of keywords are stored in the memory of the printer 10, priority may be assigned to the plurality of keywords. In such a case, the display image creation program may search for the character string in accordance with the priority. For example, if a first keyword and a second keyword are stored in the memory of the printer 10 and the first keyword has higher priority, the display image creation program judges whether the character string identical to the first keyword is included in the document firstly. If the character string identical to the first keyword is not included in the document, the display image creation program then judges whether a character string identical to the second keyword is included in the document. According to this configuration, when the optimize button 173 is depressed, portions of the characters including the character string identical to the keyword having higher priority are displayed in the display area 160a of the display 160. In such a configuration, the user can recognize the contents of the document relatively easily based on the character strings (i.e., keywords) displayed in the display area 160a.

As described above, according to the first embodiment and the modifications, the printer 10 generates the optimum reduced image data by changing the size of the image represented by the document data, and displays an image in the display area 160a of the display 160 by outputting the optimum reduced image data to the display unit 16. Specifically, the processing unit 31 (see FIG. 7) determines a target image size (e.g., A6) of the image represented by the optimum reduced image data based on a ration of the predetermined optimized character size (e.g., 6 points) to the document character size (e.g., 12 points) representing the actual size of the characters included in the document data, and the size (e.g., A4) of the image represented by the document data. Further, the processing unit 31 generates the optimum reduced image data 33d representing an image having the target image size by changing the size of the image represented by the document data. Furthermore, the processing unit 31 controls the output of the optimum reduced image data to the display unit 16 so that the optimum reduced image can be displayed in the display area 160a of the display 160. According to the above configuration, in the display area 160a, the characters included in the optimized reduced image can be displayed to have an appropriate size. Specifically, in the display area 160a, a partial image represented by part of the optimized reduced image data is displayed with the characters having an appropriate size.

As is understood from the foregoing description, according to the first embodiment and its modifications, the optimized reduced image data corresponding to the document data is generated. Alternatively, the optimized reduced image data may be generated to correspond only to part of the document data. In such a case, the partial image data represents an image having substantially the same size as the display area 160*a*, and the entire image represented by the partial image data is a part of the image represented by the optimized reduced image data.

<Second Embodiment>

Hereinafter, another image creation program which causes a computer to execute an image creation process for index printing according to a second embodiment will be described. According to the second embodiment, in the image creation process, a plurality of reduced images subject to the index printing are classified and associated with multiple groups by the image size. In the following description, configurations similar to those of the first embodiment will be simplified or omitted for brevity.

Initially, resultant outputs of the index printing according to the second embodiment will be described. FIG. 8 schematically illustrates an exemplary case where the index printing is performed with respect to reduced images a, b, c, d, e, f, g, h, i and j of multiple documents A, B, C, D, E, F; G, H, I and J. In this example, images a, b and g have the same size, images c and f have the same size, images d and e have the same size, and images i and j have the same size. As shown in FIG. 8, the images having the same size are printed on the same sheet. In FIG. 8, rectangles drawn with broken lines represent an image arrangement patterns on a sheet having a predetermined size (e.g., A4 size sheet).

When the index printing is executed, the size of the reduced image may be determined based on the ratio of the optimum character size and the size of the characters included in each document (i.e., the document character size). However, if the size of the reduced images are determined in such a manner, the sizes of the reduced images may become too many and it would be very difficult to categorize the multiple images into a relatively small number of groups as in FIG. 8, and it would be difficult to arrange the multiple images efficiently on the sheets.

According to the second embodiment, to avoid the above situation, five layout patterns (1)-(5) are defined as follows.

Pattern (1), two image areas are arranged in a matrix of 1 (row)×2 (columns).
Pattern (2), six image areas area arranged in a matrix of 2 (rows)×3 (columns).
Pattern (3), twelve image areas are arranged in a matrix of 3 (rows)×4 (columns).
Pattern (4), twenty image areas are arranged in a matrix of 4 (rows)×5 (columns).
Pattern (5), forty image areas area arranged in a matrix of 5 (rows)×8 (columns).

The patterns (1)-(5) correspond to five different sizes of the reduced images. It should be noted that the patterns described above are only exemplary ones and the number of rows/columns should not be limited to the above-indicated ones, but various modification may be defined alternatively or optionally. The number of patterns is also determined arbitrarily if it is not too large.

FIG. 9 shows a classification management table in which correspondence between the patterns (1)-(5) and reduced images a-j of the documents A-J for index printing are indicated. Specifically, the classification management table is configured such that correspondence between the layout patterns and reduced image sizes are set in advance, and names of the documents are registered when the reduced images of the documents are classified. For example, the names of the documents may be A-J as shown in FIG. 8. It should be noted that, in the classification management table, the names of the documents A-J are indicated. This configuration may be modified such that other information indicative of respective documents may replace the document names.

FIG. 10 shows a flowchart illustrating an index image creation program, which causes the printer 20 to execute the index image printing process.

It should be noted that the printer 10 (see FIG. 1) is capable of executing a normal (i.e., a conventionally-known) index printing in which reduced images for all the documents have the same size and are arranged in accordance with a predetermined arrangement pattern. According to the second embodiment, therefore, the printer 10 is configured such that the user can select the conventional index printing and the indexing printing according to the second embodiment. The index image creation process illustrated in the flowchart shown in FIG. 10 is executed when the user selects the index printing according to the second embodiment.

FIG. 12 is a chart illustrating functional blocks of the index image creating process according to the second embodiment.

A processing block 41 classifies a plurality of documents input to the printer 10 by the document character sizes (S301).

FIG. 11 is a flowchart illustrating a document classification process. In S401, the processing block 41 obtains an optimum character size 43. The optimum character size 43 represents the size of the character which can be easily recognized by the user even when the characters of the document are reduced by the index printing. The optimum character size 43 has been set to the printer 10 by the user in advance.

Next, the processing block 41 judges whether an unprocessed document exists (S402). For example, if there are ten documents subject to the index printing as shown in FIG. 8, the processing block 41 classifies the remaining documents one by one (i.e., determines to which group the page document in question should belong). For example, if the document H (see FIG. 8) has not yet been examined (S402: YES), the processing block 41 executes steps S403 onwards to classify the document H.

In S403, the processing block 41 calculates the document character size based on a predetermined number of characters included in the document H. It should be noted that the calculation of the document character is similar to that executed in S102 of the first embodiment, and description will be omitted for brevity.

In S404, the processing block 41 judges whether the document character size has been calculated. If the document character size has been successfully calculated (S404: YES), the processing block 41 proceeds to S405. If the document character size has not been calculated (S403: NO), the processing blocks proceeds to S407.

In S405, the processing block 41 calculates a ratio of the optimum character size to the document character size, and based on the thus calculated ratio and the image size of the document H, the processing block 41 calculates the optimized reduced image size. The calculation of the optimized reduced image size is similar to that of the first embodiment (see S202) and description thereof is omitted for brevity.

Next, the processing block 41 classifies the document. Specifically, the processing block 41 determines the document belongs to a pattern of which reduced image size is closest to the calculated optimized reduced image size of the document among those of five patterns (1)-(5).

That is, if the optimized reduced image size of the document A calculated in S405 is 125 mm×170 mm, the document A is determined to belong to a group corresponding to the pattern (1). Thus, the document A is registered with the classification management table 45 such that the document A corresponds to the pattern (1) in S406 (see FIGS. 9 and 12). Specifically, to which of the arrangement patterns (1)-(5) shown in FIG. 9 the optimized reduced image size of each document subject to the index printing is related is determined as follows. Firstly, for each document, five differences between the optimized reduced image size and each of the five reduced image sizes corresponding to the five arrangement patterns (1)-(5) are obtained. Then, the document is classified to use an arrangement pattern corresponding to the smallest difference. The difference may be calculated based on the shorter sides (or longer sides) of the optimized image size and the fiver reduced image sizes corresponding to the five arrangement patterns (1)-(5).

It should be noted that, when the calculated minimized reduced image size does not coincide with one of the reduced image sizes corresponding to the five patterns (1)-(5), the classification of the documents may be done as described above or in a different manner.

In S407, the processing block 41 classifies a document of which the document character size cannot be calculated to belong to a predetermined layout pattern, and register the document with the classification management table 45. An example of the document treated as above is an image file such as a JPEG file which does not include character information.

Incidentally, after execution of S406 or S407, the processing block 41 returns S402. If there are no unprocessed documents (i.e., all the documents have been processed) (S402: YES), the classification process is finished, and the processing block 41 proceeds to S302.

In S302, the processing block 41 sets a variable N to the initial value of one. The variable N is referred to for examining whether the following steps are executed for each of the arrangement patterns (1)-(5) registered with the classification management table 45. It should be noted that, according to the second embodiment, there are five arrangement patterns. Therefore, the number M of the patterns, which is referred to in the following description, is five.

Since the variable N is set to one in S302, the processing block 41 firstly retrieves the first (N-th) record of the classification management table 45, that is, the reduced image size (120 mm×160 mm) which is associated with the arrangement pattern (1). Then, in S304, the processing block 41 obtains the total number P representing the total number of reduced images which can be arranged within one page of the sheet according to the pattern (1). In a case of the pattern (1), the total number P of the reduced images per page is two (i.e., P=2). In a case of the pattern (5), the total number P of the reduced images is forty (i.e., P=40). Incidentally, in S303, which is executed after execution of S313 (described later), the reduced image size of the layout pattern corresponds to the variable N set in S313 and the total number P of the reduced images (S303, S304).

The processing block 41 judges whether image data has been developed (to a bitmap) in the print memory for all the documents which have been determined to correspond to the subject layout pattern in S305. For example, if the processing block 41 executes to process the image data corresponding to the layout pattern (1), the processing block 41 judges whether the document A and document E have been processed (i.e., the image data has been developed in the print memory).

If there exists unprocessed the unprocessed documents (S305: NO), in S306, the processing block 41 creates the reduced image data having the size identical to the reduced image size acquired in S303, then develops the reduced image data in the print memory 46 (specifically, the predetermined area defined within the RAM13 shown in FIG. 1) in S307.

Next, the processing block 41 judges whether the reduced image data corresponding to all the number P of the reduced images has been developed in the print memory (S308). For example, a case where the documents A, B and G which correspond to the layout pattern (1) are processed in this order will be described. When the reduced image data based on the document A has been developed in the print memory, the processing block 41 judges that the image data corresponding to all the number P of images have not been developed in the print memory (S308: NO). Therefore, the processing block 41 proceeds to S305. In this case, the processing block 41 executes S306 and S307 to process the next document B.

If the reduced image data corresponding to the documents A and B has been developed in the print memory and a sheet of index image 47 can be output, the processing block 41 judges that the image data corresponding to all the documents has been developed in the print memory (S308: YES), and transmits image data of the index image 47 which is developed based on the documents A and B to the printing unit 18. Then, the printing unit 18 prints out the index image based on the transmitted image data (S309). Thereafter, the processing block 41 proceeds to S305, and executes S307 and S307 for the last document G. Then, as the judgment in S308 is negative, the processing block 41 returns to 8305 again.

If the processing block 41 executes S306 and the document G has been processed, the processing block 41 judges in S305 that the image data corresponding to all the documents classified to belong to the layout pattern (1) has been developed in the print memory (S305: YES), and the processing block 41 proceeds to S301.

In S310, the processing block 41 judges whether there exists developed reduced image data, which has not yet been printed, in the print memory. If such data exits (S310: YES), the processing block 41 transmits the image data to the printing unit 18 to print out the image represented by the reduced image data (S311). If such data is not exists in the print memory (S312: NO), the processing block 41 proceeds to S312.

An exemplary case where the judgment in S310 is "YES" will be described. It is assumed that the layout pattern (1) is select. As described above, the processing block 41 executes S306 etc. to process the document 0, and then proceeds to S310. Therefore, in S310, the processing block 41 determines that there exists the reduced image data, which is generated based on the document G and developed, in the print memory (S310: YES), and print outs the image represented by the developed print data (S311). Printing based on the arrangement pattern (1) is illustrated in FIG. 8.

In S312, the processing block 41 judges whether steps S303 onwards have been finished for all the layout patterns registered in the classification management table 45. Specifically, the processing block 41 judges that all the arrangement patterns have been processed (S312: YES) if the variable N has become equal to the number M of the layout patterns. Otherwise (S312: NO), the processing block 41 determines that there remains the unprocessed layout pattern and updates the variable N by adding one (S313). Thereafter, the processing block 41 returns to S303 and continues the process.

In the example of the layout pattern (1), the initial value of the variable N is one (which is set in S302), while the number M of the layout patterns is five. As the processing block 41 proceeds, the judgment in S312 is "NO" and the variable N is updated to two. Then, the processing block 41 executes the steps S303 onwards with respect the layout pattern (2).

Regarding the layout pattern (5), since the number N of the patterns is five and the variable N is also five (as the above process is repeated, the variable N is incremented and reaches five). Then, the judgment in S312 by processing block 41 is "YES" and the process is finished.

The image creation process for index printing has been described. According to the second embodiment, reduced images having characters of which the size is equal to or close to the optimum character size that is set by the user in advance are created and used for the index printing. Therefore, when the index printing is executed, images including characters which can be recognized by the user can be printed.

According to the second embodiment, the page documents are classified by the document character size and the documents are registered with the classification management table 45 (S301). Then, based on the classification management table 45, reduced images are created for each layout pattern and then the index printing is executed to collectively print the reduced images on the same sheet. Therefore, the capacity of the print memory can be saved.

It should be noted that if one document consists of multiple pages, various method may be available to determine which one the multiple pages is subjected to the index printing. For example, the first page of the document may be selected, or the first page of the pages that include characters may be selected. Alternatively, a page that includes characters which are used for calculating the document character size may be selected as the page to be printed.

Incidentally, according to the second embodiment, an entire page of the document is reduced to form the reduced image. Therefore, based on the document size and/or document character size, the reduced images may have different sizes and classified in different groups (patterns). It may be possible to fix the size of the reduced images. That is, only one arrangement patter (e.g., the pattern (3)) may be used. In such a configuration, as in the first embodiment, a predetermined area of the reduced image may be extracted and arranged on a sheet to execute the index printing.

According to the second embodiment, a plurality of layout patterns are prepared and each of the reduce images is associated with one of the plurality of patterns. The images corresponding to the same pattern are reduced to have the same image size, and the index printing is executed by arranging the images reduced to have the same size according to the layout pattern. This may be modified such that the index printing may be executed with the reduced images having the calculated optimized reduced sizes. In such a case, a sheet can be efficiently used if the reduced images are appropriately arranged to lessen marginal portions.

As described above, according to the second embodiment, the printer 10 changes the size of the image represented by the document data to generate the reduced image data and prints out the image within the displaying frame (FIG. 8) of the sheet by outputting the reduced image data to the printing unit 18. Specifically, the processing unit 41 determines the reduced image size of the document data based on the ratio of the predetermined optimum character size to the document character size representing the size of the characters included in the document data, and the image size represented by the document data. Further specifically, the processing unit 31 calculates the optimized reduced image size of the image represented by the document data (S405) as is done in the first embodiment. Then, the processing unit 41, based on the optimized reduced image size, classifies the document data to use one of the layout patterns (1)-(5) (S406). Since the reduced image sizes assigned to the five layout patterns are different from each other, based on the optimized reduced image size for each document data (e.g., document a), one reduced image size (e.g., 120 mm×160 mm) which is substantially equal to the optimized reduced image size. Then, the processing unit 41 changes the size of the image represented by the document data, for each layout pattern, to create the reduced image data representing the image having the reduced size (S306). Further, the processing unit 41 controls the output of the reduced image data to the printing unit 18 so that the reduced images are printed within print frame of the sheet. With this configuration, the characters included in the reduced image can be printed to have an appropriate size.

The first and second embodiments are described separately. However, the invention should not be limited to the embodiments as described and can be modified in various ways without departing from the scope of the invention. For example, the printer may be implemented with configurations of both the first embodiment and second embodiments.

What is claimed is:

1. An image processing device configured to change a size of original image data representing an original image so as to create size-changed image data representing a size-changed image and output the size-changed image data to an output device in order to show an image within an image formation area in an output image, the image processing device comprising:
an image size determination unit configured to determine a target image size of the size-changed image data that is to be created, based on a ratio of a predetermined standard character size to a character size regarding character data included in the original image data and based on an image size of the original image data;
an image data creating unit configured to change the size of the original image data so as to create the size-changed image data, based on the determined target image size; and
an output control unit configured to control an output of the created size-changed image data to the output device such that the size-changed image is shown within the image formation area in the output image.

2. The image processing device according to claim 1, wherein the image size determination unit comprises:
a selection unit configured to select specified character data representing a specified character from the character data included in the original image data, and
wherein the image size determination unit is configured to determine the target image size using a specified character size regarding the specified character data as the character size regarding the character data.

3. The image processing device according to claim 2, wherein
the selection unit is configured to select the specified character data from the character data included in the original image data, the specified character data representing a character string that is coincident with a predetermined keyword.

4. The image processing device according to claim 2, wherein
the selection unit is configured to select the specified character data from the character data included in the original image data, the specified character data representing a plurality of characters including a first letter.

5. The image processing device according to claim 2, wherein
the output control unit is configured to control the output of the size-changed image data such that the specified character represented by the specified character data is shown within the image formation area with a size substantially the same as the predetermined standard character size.

6. The image processing device according to claim 5, further comprising:
    a specifying unit configured to specify an occurrence position of the specified character data in the original image data,
    wherein the output control unit is configured to specify, in the size-changed image data, a corresponding position that corresponds to the occurrence position and control the output of the size-changed image data such that the corresponding position is located within the image formation area.

7. The image processing device according to claim 1, wherein:
    if a plurality of the size-changed images represented by a plurality of pieces of the size-changed image data that are created from a plurality of pieces of the original image data are shown in a plurality of the image formation areas defined in the output image,
    (a) the image size determination unit is configured to determine the target image size of the size-changed image data, for each of the plurality of pieces of the original image data,
    (b) the image data creating unit is configured to create the size-changed image data based on the target image size, for each of the plurality of pieces of the original image data, and
    (c) the output control unit is configured to control the output of the plurality of pieces of the size-changed image data such that the plurality of pieces of the size-changed images are shown in the plurality of image formation areas, respectively.

8. The image processing device according to claim 1, wherein the image size determination unit comprises:
    a candidate image size determination unit configured to determine a candidate image size for the size-changed image data, based on a ratio of the standard character size to the character size regarding the character data included in the original image data and based on the image size of the original image data; and
    a target image size determination unit configured to select one type of standard image size from among a plurality of types of standard image sizes, and determine the selected one type of standard image size as the target image size of the size-changed image data, wherein each of the plurality of types of standard image sizes is different from each other, and the selected one type of standard image size is substantially equal to the candidate image size.

9. The image processing device according to claim 8, wherein:
    the target image size determination unit comprises:
    a classification unit configured to select the one type of standard image size substantially equal to the candidate image size corresponding to the original image data, and classify the original image data into one type of layout pattern from among a plurality of types of layout patterns, wherein the plurality of types of layout patterns are corresponding to the plurality of types of the standard image sizes, respectively, and each of the plurality of types of layout patterns defines the image formation area having the corresponding standard image size;
    if the plurality of size-changed images represented by the plurality of pieces of size-changed image data that are created from the plurality of pieces of the original image data are shown in accordance with one type of the layout pattern among the plurality of types of layout patterns,
    (a) the image size determination unit is configured to determine the one type of standard image size substantially equal to the candidate image size as the target image size, and classify the original image data into one type of the layout pattern among the plurality of types of layout patterns, for each piece of the original image data,
    (b) the image data creation unit is configured to change the size of the original image data classified into the respective layout patterns so as to create the size-changed image data based on the determined target image size, for the respective layout patterns, and
    (c) the output control unit is configured to control, for respective layout patterns, the output of the size-changed image data such that the size-changed images are shown in the image formation areas defined by the respective layout patterns.

10. The image processing device according to claim 8, wherein the target image size determination unit is configured to obtain a plurality of differences between the plurality of types of standard image sizes and the candidate image size, and select the one type of the standard image size corresponding to the smallest one of the plurality of differences.

11. The image processing device according to claim 1, wherein the output device comprises a display device.

12. The image processing device according to claim 1, wherein the output device comprises a printing device.

13. A non-transitory computer readable medium containing a computer program including instructions which causes the computer to execute an image processing operation that changes a size of original image data representing an original image so as to create size-changed image data representing a size-changed image and outputs the size-changed image data to an output device in order to show an image within an image formation area in an output image, the instructions causes the computer to:
    determine a target image size of the size-changed image data that is to be created, based on a ratio of a predetermined standard character size to a character size regarding character data included in the original image data and based on an image size of the original image data;
    change the size of the original image data so as to create the size-changed image data, based on the determined target image size; and
    control an output of the created size-changed image data to the output device such that the size-changed image is shown within the image formation area in the output image.

14. The image processing device according to claim 1, wherein the image size determination unit comprises:
    a selection unit configured to select specified character data representing a specified character, which is a part of the plurality of characters included in the original image, from the character data included in the original image data, and
    wherein the image size determination unit determines the target image size using a character size of the specified character data as the character size of the character data.

15. The non-transitory computer readable medium according to claim 13, wherein the step of determining includes selecting specified character data representing a specified character, which is a part of the plurality of characters included in the original image, from the character data included in the original image data, and determining the target image size using a character size of the specified character data as the character size of the character data.

16. An image processing device configured to change a size of original image data representing an original image so as to create size-changed image data representing a size-changed image and output the size-changed image data to an output device in order to show an image within an image formation area in an output image, the image processing device comprising:

a controller comprising:

an image size determination unit configured to determine a target image size of the size-changed image data that is to be created, based on a ratio of a predetermined standard character size to a character size regarding character data included in the original image data and based on an image size of the original image data;

an image data creating unit configured to change the size of the original image data so as to create the size-changed image data, based on the determined target image size; and an output control unit configured to control an output of the created size-changed image data to the output device such that the size-changed image is shown within the image formation area in the output image.

\* \* \* \* \*